United States Patent [19]

Wesley

[11] Patent Number: 4,852,893
[45] Date of Patent: Aug. 1, 1989

[54] ELASTOMERIC COATED PERFORATED METAL CORE COMPOSITE GASKET AND METHOD OF MAKING SAME

[75] Inventor: Alan C. Wesley, Wildwood, Ill.

[73] Assignee: Fel-Pro Incorporated, Skokie, Ill.

[21] Appl. No.: 280,327

[22] Filed: Dec. 6, 1988

[51] Int. Cl.⁴ .............................................. F16J 15/12
[52] U.S. Cl. .................... 277/1; 277/235 B; 277/234
[58] Field of Search ................ 277/1, 166, 232–234, 277/235 R, 235 A, 235 B, 236; 29/521

[56] References Cited

U.S. PATENT DOCUMENTS 3,532,349 10/1970 Czernik ..................... 277/235 B X
3,565,449  2/1971 Ascencio et al. ............... 277/235 B
4,705,278 11/1987 Locacius et al. ............... 277/235 B

FOREIGN PATENT DOCUMENTS 3019775 12/1981 Fed. Rep. of Germany ... 277/235 B

*Primary Examiner*—Robert S. Ward
*Attorney, Agent, or Firm*—Dressler, Goldsmith, Shore, Sutker & Milnamow, Ltd.

[57] ABSTRACT

A gasket formed from an elastomer precoated metallic sheet which is then perforated to provide projecting clinching tangs and thereafter combined with a facing layer to form gasketing material. The gasketing material is thereafter blanked to provide service and other openings. A method of making that gasket is also disclosed.

9 Claims, 1 Drawing Sheet

ELASTOMERIC COATED PERFORATED METAL CORE COMPOSITE GASKET AND METHOD OF MAKING SAME

BACKGROUND OF THE INVENTION

Tanged, perforated metallic core based gaskets for automotive engine usage and the like have been in vogue for many, many years. Frequently such gaskets comprise a central metallic core with facing layers of fiber-elastomer sheets combined with the core via clinching tangs struck from the core to project outwardly from the core so that the metallic core and facing layers may readily be combined and secured.

In some cases such gaskets comprise a tanged core with a facing layer clinched to one face only. In such instances, the surface of the perforated core opposite the surface to which the facing layer is clinched is frequently treated and coated with a variety of materials for different purposes. One such class of materials comprises elastomeric, or rubber-like materials. However difficulties are encountered in providing fully effective elastomeric coatings. For example, many high-temperature elastomers require high curing temperatures, temperatures which sometimes exceed the temperature tolerance of the elastomer in the fiber-elastomer facings. That circumstance eliminates the possibility of using a number of highly desirable elastomeric coatings.

Further, depending on the combining process used and the sealing load between the surfaces to be sealed, the tangs themselves are sometimes subjected to deleterious corrosive conditions in use. Post coating of a combined tanged core and facing layer does not permit coating of the portions of the tangs projecting into the facing layer and certainly does not permit coating of the surfaces of the core or the surfaces of the tangs on the side to which the facing layer is clinched.

It would be desirable, therefore, to provide an improved metallic core-clinched gasket which is suitably coated to enhance the sealing characteristics thereof.

SUMMARY OF THE INVENTION

In accordance with the present invention an improved thin gasket defining at least one service opening is provided. The gasket comprises a tanged perforated metallic layer having clinching tangs projecting from at least one side of the metallic layer, the metallic layer being formed from an imperforate metallic sheet pre-coated prior to perforation with an elastomeric or rubber layer on at least one of its major surfaces, whereby the subsequently formed projecting tangs are pre-elastomer coated, and the gasket further including a facing layer disposed against one of the major surfaces and clinched by the tangs to the metallic layer.

The elastomeric layer may be provided on the major surface from which the tangs project outwardly, or on the major surface opposite the surface against which the facing layer is clinched, or both. Desirably the facing layer is a fiber-elastomer composite.

Preferably the gasket is one of an automotive manifold gasket and a head gasket, and the gasket defines at least two high-temperature service openings and at least two water or oil apertures.

The improved method of the present invention for making a high-temperature and corrosion resistant gasket comprises the steps of providing an imperforate metallic layer and coating the metallic layer on at least one side with a high-temperature resistant elastomeric coating to provide a coated metallic layer, perforating the coated metallic layer to provide a large plurality of clinching tangs projecting from one side thereof, providing a facing layer, combining the facing layer with the clinching tangs to form gasketing material, and blanking the gasketing material to form a plurality of openings to provide a gasket. The tangs may be formed to project outwardly from the side of the metallic layer opposite the side which is coated, or outwardly from the other side, or both.

Further objects, features and advantages of the present invention will become apparent from the following description and drawings.

DETAILED DESCRIPTION

Figure 1:
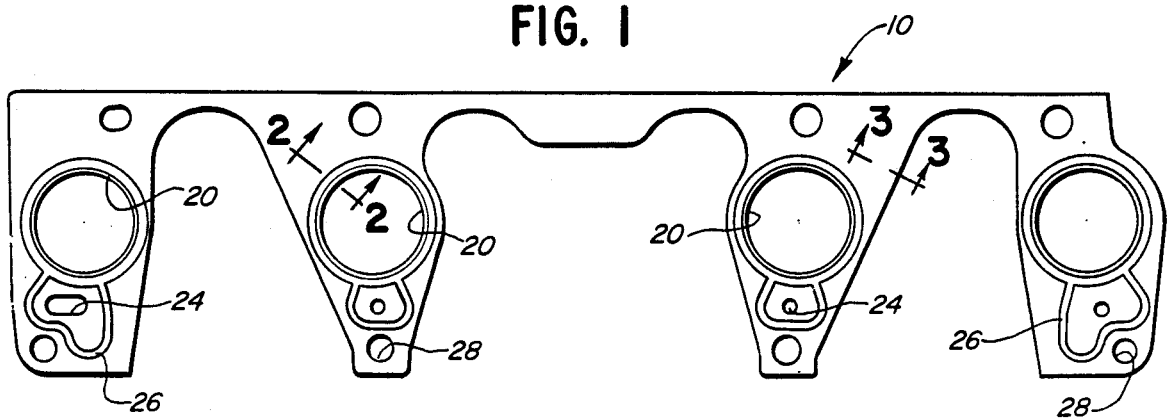
FIG. 1 is a plan view of a typical gasket of the present invention.
Figure 2:
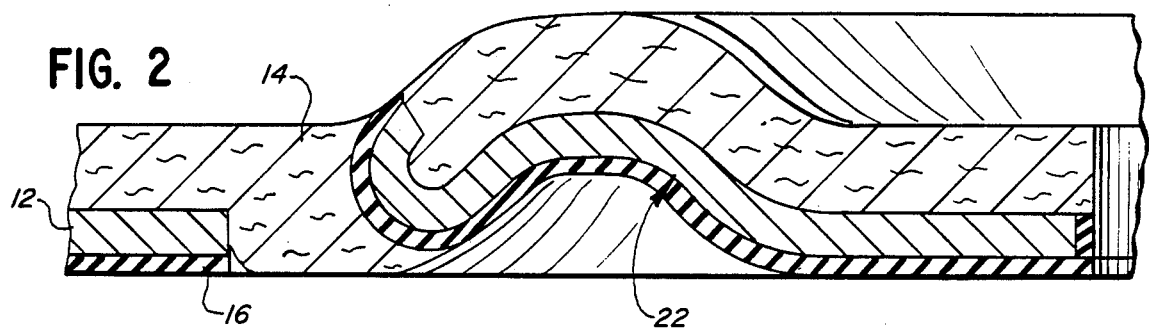
FIG. 2 is an enlarged cross-sectional view taken substantially along line 2—2 of FIG. 1.
Figure 3:
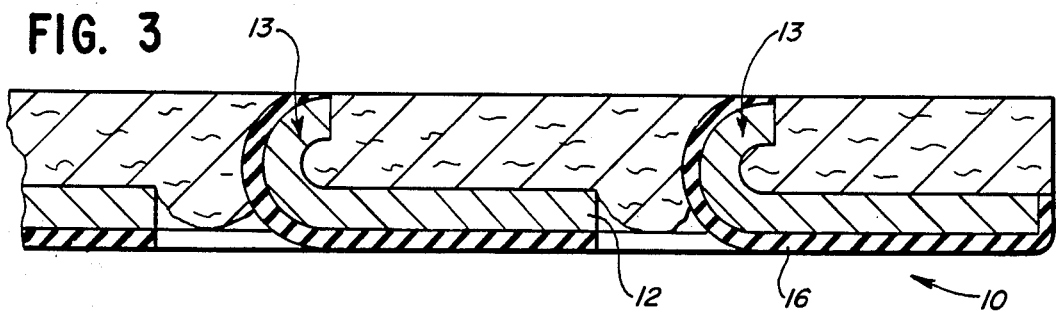
FIG. 3 is a greatly enlarged cross-sectional view taken substantially along line 3—3 of FIG. 1.

Referring now to the drawings, FIG. 1 is a plan view of an intake manifold gasket 10 employing the principles of the present invention. Gasket 10 comprises a metallic layer or core 12 having a pair of major surfaces and a facing layer 14. In the embodiment of FIGS. 1–3, the metallic core 12 was pre-coated with an elastomeric microsealing layer 16 prior to perforation. Layer 16 is very thin, but is shown greatly exaggerated in proportion for illustrative purposes.

As seen in FIG. 1, the gasket 10 is provided with a plurality of high-temperature service openings 20 which desirably are surrounded by sealing beads comprising corrugations 22 of a known type, and with other openings 24 through which coolants may pass. Sealing corrugations 26 surrounding openings 24 may be provided as well. The gasket 10 also defines suitable bolt openings holes 28 to allow bolts clamping the surfaces facing the gasket to pass therethrough. All of the apertures or openings may be conventional.

As best seen in greatly enlarged FIG. 3, the outer side or outer major surface of the metallic core 12 is provided with the microsealing elastomeric layer 16. Layer 16 not only covers the outer core surface 30, but, as shown in the drawings, also covers the outer surfaces of clinching tangs 13 which project into the facing layer 16. Thus, to the extent that the combining of the facing layer and core in the illustrated embodiment is at a low pressure or for some reason does not fully cause encapsulation or embedment of some or all of the tangs 13 on the coated side of the gasket, they will be protected from the corrosive effect of coolants, waters and gases to which they might be exposed in use. In any event the pre-coating of the core prior to perforation assures an effective elastomeric coating of the outer, exposed core surface when that is desired. That is particularly important where the elastomeric coating is of a type which requires curing at a temperature which exceeds the temperature at which the elastomer of the fiber-elastomer facing is stable.

Figure 4:
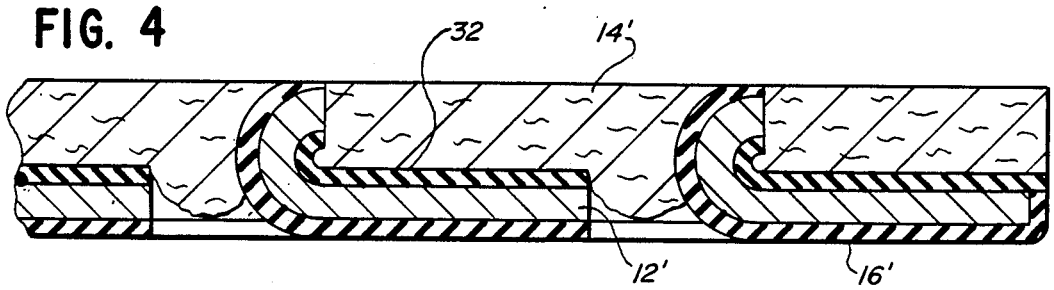
FIG. 4 is a greatly enlarged cross-sectional view like FIG. 3, but of a further embodiment of the present invention.

As shown in FIG. 4, it is also possible to provide an elastomeric coating on the inner major surface or face of the core, namely the surface contacting the facing and against which the facing is clinched. It is, of course, impossible to post-coat that surface, and, as such, where such is desirable, the present invention is particularly important.

There are situations in which poor combining occurs and where there are low clamp loads, i.e., where high contact pressure between the facing and the metallic core fails to occur. Under such circumstances the sealing qualities of an elastomeric coating between the facing and core would be of advantage. By pre-coating the core, i.e., prior to perforation, an effective and uniform coating can be obtained which would not be possible or feasible after perforation and before combining, and which would be impossible after combining a tanged core with a facing.

FIG. 4, which is a greatly enlarged, shows an elastomeric coating 32 on the inside surface of the core 12', as well as a coating 16' on the outside surface as was shown in connection with the embodiment of FIGS. 1-3. This shows that one or both of the main or major surfaces of the core may be pre-coated, so that both the major surfaces and the surfaces of the tangs 13 are coated on each side.

The core material may be conventional black plate, zinc plate, or stainless steel, and may be of thicknesses running from about 0.006 to about 0.012 inch in thickness. The elastomeric or rubber coating may be a nitrile rubber or Viton or other materials applied by spraying, flow coating or other well known techniques, and may be of a thickness of from about 0.0005 inch to about 0.005 inch. In a preferred form, the core is 0.006 inch and the coating, of Viton is of a thickness of 0.001 inch. Viton is a fluoroelastomer rubber available from E. I. DuPont. Similar materials are available from 3M and others. This is not to the exclusion of other elastomers.

The fiber preferred facing may be a non-asbestos fiber reinforced composite facing, and having a thickness of about 0.010 to about 0.035 inch. In a preferred form, the facing is a Kevlar beater-addition sheet, and a thickness of 0.020 inch. Kevlar is a trademark of E. I. DuPont for polyaramid fibers. Other fiber-elastomer facings and other facings, such as graphite facings, may be employed as well.

In the manufacture of a gasket of the present invention a layer such as a sheet or coil of plain, imperforate or unperforated metallic core stock is provided. It is then coated with the elastomer on at least one side with a high-temperature resistant elastomeric coating, following which it is perforated in any one of a variety of known ways to provide a large plurality of clinching tangs projecting from one side, such as about 50 or more per square inch. If facings are to be clinched to both surfaces, tangs may be formed to project outwardly from both surfaces in a known manner.

The core surface or surfaces are coated as well as the surfaces of the clinching tangs which remain coated through the perforating step. Thereafter the selected facing is provided and juxtaposed and clinched to the core via the tangs in a conventional manner. Following that the stock material is blanked in appropriate fashion to provide the perimetric configuration and the openings, and is embossed to provide the desired corrugations, all in a known manner.

Although the illustrated gasket is an intake manifold gasket, other gaskets such as automotive head gaskets, among others, may be made in accordance with the present invention. Other modifications within the spirit and scope of the present invention will become apparent to those skilled in the art from the foregoing.

What is claimed is:

1. A thin gasket defining at least one service opening comprising:
    a tanged perforated metallic layer having clinching tangs projecting from one side of said metallic layer, said metallic layer being formed from an imperforate metallic sheet pre-coated with an elastomeric layer on at least one of its major surfaces, whereby the subsequently formed projecting tangs are pre-coated, and
    a facing layer clinched against one of said major surfaces by said tangs to said metallic layer.

2. The thin gasket of claim 1, and wherein said elastomeric layer is provided on the major surface from which the tangs project outwardly.

3. The thin gasket of claim 1, and wherein said elastomeric layer is provided on the major surface opposite the surface against which the facing layer is clinched.

4. The thin gasket of claim 2, and wherein the facing layer is a fiber-elastomer composite.

5. The thin gasket of claim 3, and wherein the facing layer is a fiber-elastomer composite.

6. The thin gasket of claim 1, and wherein said gasket is one of an automotive manifold gasket and a head gasket, and wherein said gasket defines at least two high-temperature service openings and at least two water or oil apertures.

7. A method of making a high-temperature and corrosion resistant gasket comprising the steps of:
    providing an imperforate metallic layer,
    coating said metallic layer on at least one side with a high-temperature elastomeric rubber coating to provide a coated metallic layer,
    perforating said coated metallic layer to provide a large plurality of clinching tangs projecting from one side thereof,
    providing a facing layer,
    combining said facing layer with said clinching tangs to form gasketing material, and
    blanking said gasketing material to form a plurality of openings to provide a gasket.

8. The method of claim 7, and wherein said tangs are formed to project outwardly from the side of said metallic layer opposite the side which is coated.

9. The method of claim 7, and wherein during said blanking step, a plurality of high-temperature service openings and a plurality of water or oil openings are formed.

* * * * *